INVENTORS.
HERBERT LEMPER
WILLIAM H. SNEE, JR.

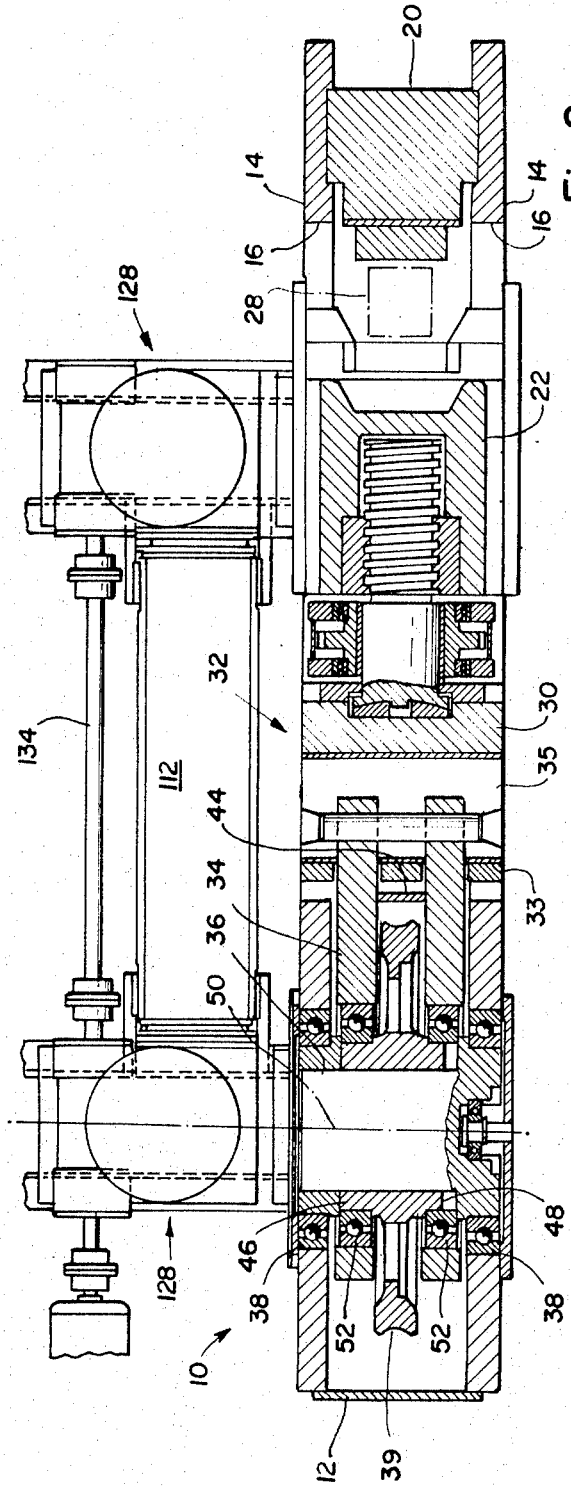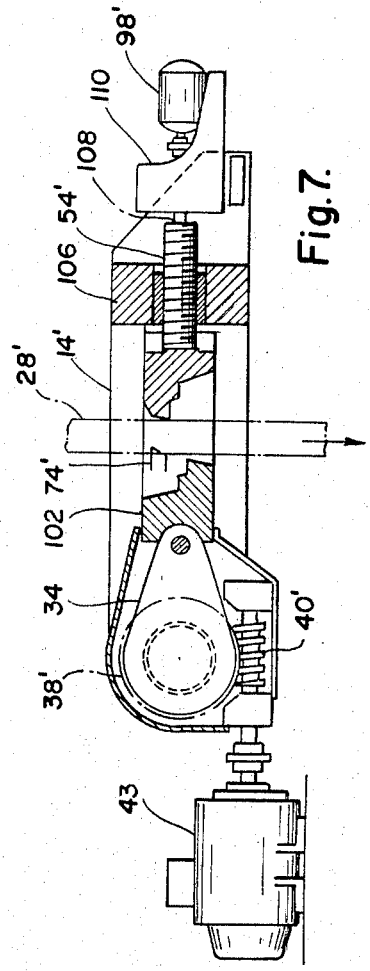

BY their ATTORNEYS

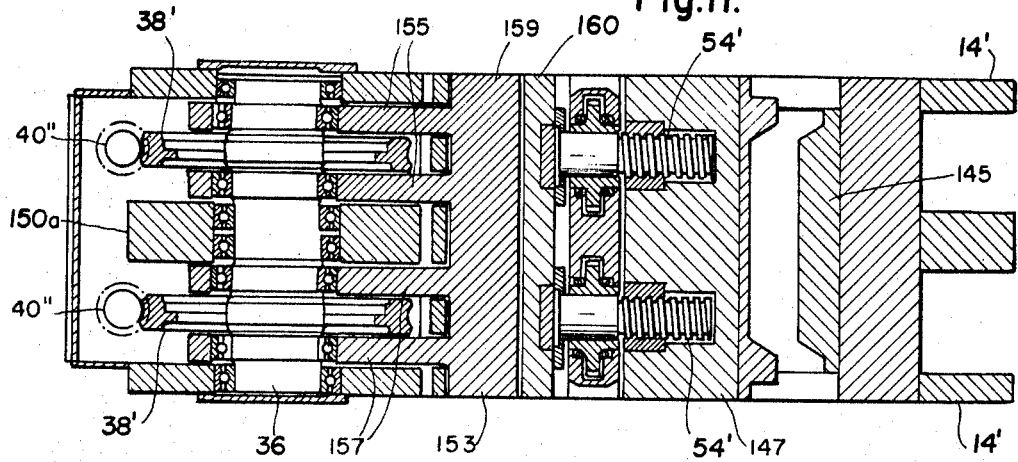
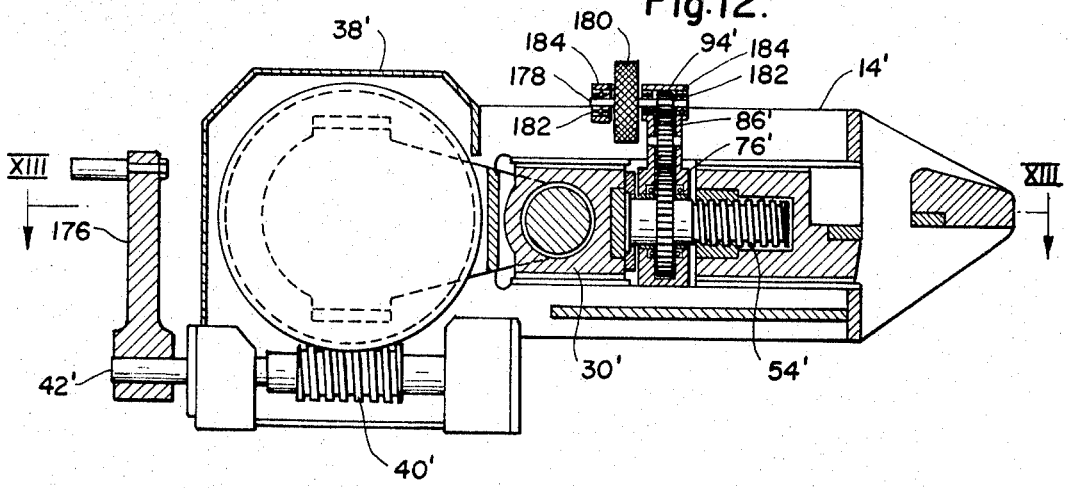
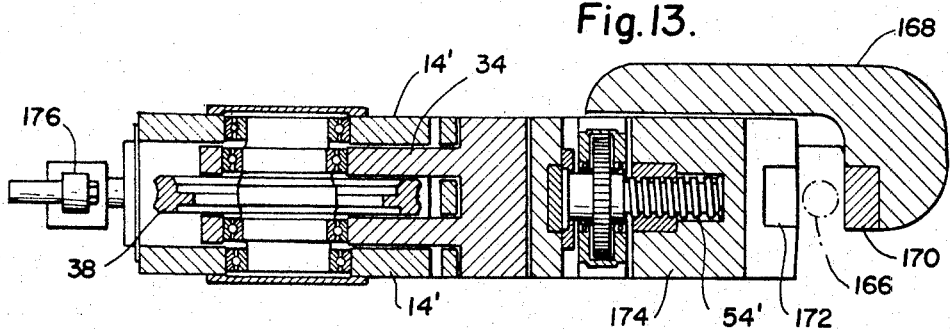

United States Patent Office 3,453,914
Patented July 8, 1969

3,453,914
FORCE-MULTIPLYING MECHANISMS
Herbert Lemper and William H. Snee, Jr., Pittsburgh, Pa., assignors to Mesta Machine Company, Pittsburgh, Pa., a corporation of Pennsylvania
Filed Apr. 21, 1966, Ser. No. 544,198
Int. Cl. B26d 3/08
U.S. Cl. 83—8        13 Claims

ABSTRACT OF THE DISCLOSURE

In a force-multiplying mechanism for displacing at least one of a pair of force-transmitting members relative to the other, we disclose the combination comprising means for incrementally and intermittently moving one of said members against load means when disposed to be confined between said members, said moving means being intermittently operable to advance said one member against said load, and variable spacing means coupled to one of said members for moving the last-mentioned member relative to said moving means in a direction to retain said last-mentioned member against said load means and remain in engagement with both of said force-transmitting members throughout the non-operating intervals of said moving means.

---

The present invention relates to force-multiplying means which are adapted for the application of relatively very large forces over relatively short distances and finds application in the construction of a wide range of power tools, for example, various types and sizes of presses, shears, cutters and the like. The invention is particularly useful in such applications where space is at a premium.

In one exemplary application of the invention, the force-transmitting means are associated with relatively large capacity force-transmitting members, such as shears used in the steel industry for various applications. In certain modifications of this form of the invention, the force-transmitting means are described in connection with a novel arrangement of a large capacity bloom shear which is particularly adapted for use in a continuous casting, vertical bloom casting apparatus.

Under these conditions it is necessary to minimize the physical size of the shear owing to the limitations imposed by the distances between the strands of the casting apparatus which in turn must be maintained on closely spaced centerlines to minimize temperature drops in the tundish supported between the ladle and molds for the blooms for the purpose of distributing the molten steel from the ladle to the individual molds.

As dictated by operational speeds of the apparatus, the bloom shears, a number of which are used for each bloom apparatus and are associated respectively with the individual strands or blooms issuing from the molds, must be able to apply sufficient force to the blades of the shears in order to make each cut in a matter of seconds. In a typical bloom mill, when fabricating 12½″ by 12½″ blooms for example, the blooms must be severed or cut into the desired lengths, with about 15 seconds being allowed for each cut.

While the cut is being made, suitable means must be provided to lower the shears at the speed of the associated strand while the cut is being made and then to return the shears to their starting positions. Because of the extremely heavy weight of the shears, considerable power must be expended in conventional vertical mills for thus moving the shears, and, of course, such power is multiplied by the number of strands of such apparatus. Accordingly, for the several shears required, a number of relatively large and expensive jacks or other lifting means and drives therefor had to be incorporated into an already overcrowded production area.

The time allowed for shearing the bloom, of course, is determined by the casting speed of the bloom apparatus and by the space which can be allotted to conveniently lowering and raising the shears during and after making the cut. In the aforementioned specific example, the casting speed of the bloom strand is about 16 feet per minute while the vertical reciprocative distance of the individual shears is about 4 feet. Thus, the cut must be made within about 15 seconds. Obviously, however, if a given one of the shears fails to make a cut, the entire strand is lost in production, which is only an initial portion of damages resulting from loss of production during the time required to restart the apparatus. Therefore, it is imperative that the most reliable of force-multiplying means be employed for moving the shear blades and for lowering and raising the shears.

An obvious and reliable expedient, for operating shears, therefore, is to couple the movable blade of the shears to an eccentric portion of a drive shaft forming part of the shear mechanism. However, in conventional shears of this type, the power requirements for shearing the aforementioned 12½″ by 12½″ blooms, necessitate a 1500 ton bloom shear with a shearing stroke of about 15 inches, with the larger stroke being dictated by the necessary and well-known clearances demanded by the bloom strands and associated components of the bloom apparatus. The required torque at the eccentric shaft would, therefore, be 3 million pounds times 7.5″ or 22½ million inch-pounds. In order to complete a cut within 15 seconds, as required, the eccentric drive shaft of the conventional shears would have to be rotated at 4 r.p.m. To produce the necessary torque at such slow speeds, a very large and expensive, electric motor drive, operating at a relatively slow rotative speed, for example at 250 r.p.m., would require a speed reduction in the ratio of about 62.5 to 1. Speed reducers of this size in addition to their high initial expense seldom have more than a 75% efficiency.

The power requirement per shears is:

$$HP = \frac{22,500,000 \times 4}{63,000 \times .75} = 1900$$

The initial expense for a slow speed motor drive of this type, particularly when multiplied by a number of shears employed in a typical bloom apparatus, is enormous. Such expense is multiplied by the very large speed reduction units and force-transmitting linkages of the shears, as required by the extremely large transmitted torques. Besides the high procurement, construction and maintenance costs, the physical sizes of the large motor drives, the large speed reduction units, and the oversized force-transmitting components of the shears occupy much valuable manufacturing floor area.

These difficulties are overcome by the disclosed shear arrangement wherein novel and efficient force-multiplying mechanisms are employed for operating the blades of the shear and for lowering and raising the entire shear structure as required. Thus, in the force-multiplying mechanism for moving one or both blades of the shears, an eccentric is provided for imparting relatively small increments of motion to one of the shear blades, and then during each backstroke of the eccentric, spacing means are adjustably coupled to the one or to the other of the blades to provide incremental movement thereof toward the other blade until the cut is completed. As noted above and as set forth more clearly hereinafter, such adjustable spacing means can be coupled to either of the shear blades.

Continuing the aforementioned applicative example, the shear drive shaft is provided with an eccentric having only a minor fraction of the throw required in conventional shears to make the necessary cut, but is operated several itmes during the course of making the cut in order to afford the aforementioned incremental moving of the shear blade coupled to the adjustable spacing means until the shear blades are substantially closed or until the cut is completed. Thus, for purposes of comparison, it may be assumed that the novel eccentric arrangement of the invention is provided with a ¼" throw and thus the torque required is 3 million pounds times .25" or only 750,000 inch-pounds. Therefore, assuming that the shear blade is operated incrementally throughout the entire stroke of 15", the eccentric can be rotated not at 4 r.p.m. as in the conventional case, but at the rate of 30 revolutions for each cut or 120 r.p.m. This arrangement permits a high speed (1200 r.p.m., for example), and much less expensive electric motor drive to be utilized instead of the aforementioned 250 r.p.m. motor. Moreover, the speed reduction unit need be only a 10 to 1 ratio rather than the 62.5 to 2 ratio of the conventional arrangement. Consequently, the reduction unit is more efficient and much less complicated, but more importantly the unit is of much lighter construction and therefore much less expensive since it must handle, in the given example of the invention, only about ⅟₃₀ of the torque required by the prior art. In summary then, the disclosed force-transmitting mechnism effects, by its novel organization, considerable reductions in physical sizes and expense of the drive motor, the speed reduction unit, and the force-transmitting components of the shears. More importantly, the novel force-transmitting mechanism permits the consrtuction of larger capacity shears, presses and other powered tools than is presently feasible. On the other hand, the novel force-multiplying mechanism permits the construction of various manually-operated tools, or smaller power tools with fractional HP drives, with correspondingly increased capacities.

The force-transmitting mechanism associated with the lifting arrangement for the shears or other appropriate machinery is provided with novel weight counter-balancing means associated therewith whereby the major proportion of the weight of the shears is counter-balanced at all times during use thereof. In one arrangement of the last-mentioned force-transmitting mechanism, hydraulic counter-balancing means are employed to support for example 90% of the weight of each of the shears used in the bloom apparatus. Since the counter-balancing force is continuously applied, the moving components of the lifting mechanism for raising and lowering the shears can be much lighter weight in construction and, therefore, is less expensive, easier to maintain, and less subject to wear. In the latter connection, it should be noted that the lifting mechanism is not subject to reversals in direction of movement under the full weight of the shear, but rather under only a small fraction thereof with the result that wearing of the components of the lifting device including particularly the moving parts of the latter-force-transmitting mechanism, is considerably reduced. The motive power supplied to the gearing forming part of the lifting means of this feature of the invention is correspondingly reduced together with the physical sizes of the inter-connecting drive shafts and other related components.

Because of the much lesser torques required for a given application of the force-multiplying mechanism of the invention, the latter can be made correspondingly smaller in size and thus are equally adaptable for use in extremely large capacity shears, presses or the like or in very small manually or power operated tools. The force-transmitting means of the invention makes possible the construction of such shears and presses having capacities which are not otherwise feasible, particularly where space limitations impose restrictions on the sizes of the individual components.

In the foregoing, various objects, features and advantages of the invention have been alluded to. These and other objects, features and advantages of the invention will be elaborated upon during the forthcoming description of certain presently preferred embodiments of the invention together with preferred methods of practicing the same.

In the accompanying drawings, we have shown certain presently preferred embodiments of the invention together with presently preferred methods of practicing the same, wherein:

FIGURE 2 is a longitudinally sectioned view of the apparatus as shown in FIGURE 1 and taken along reference line II—II thereof;

FIGURE 7 is a longitudinally sectioned view of the shearing apparatus as shown in FIGURE 6 of the drawings and taken along reference line VII—VII thereof;

FIGURE 11 is another longitudinaly sectioned view of the apparatus as shown in FIGURE 10 and taken along reference line XI—XI thereof;

FIGURE 12 is a longitudinally sectioned view of another arrangement of the force-multiplying means of the invention adapted for hand-operation and thus illustrating still another application of the multiplying means; and FIGURE 13 is another longitudinally sectioned view of the apparatus as shown in FIGURE 12 and taken along reference line XIII—XIII thereof.

Figure 1:
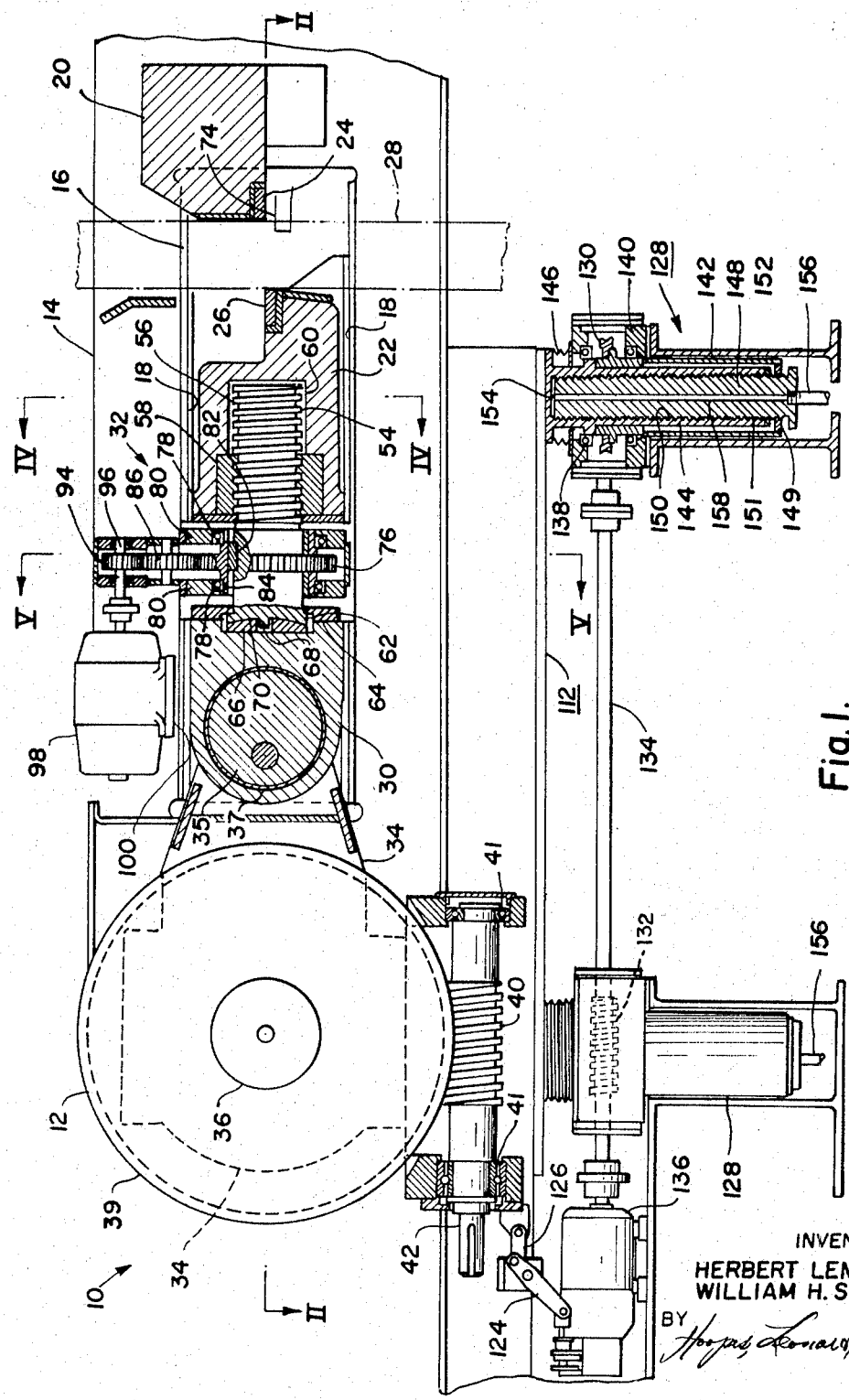
FIGURE 1 is a side elevational view, partially in section, of one form of shearing mechanism arranged in accordance with the invention and incorporating the aforementioned force-multiplying means for actuating the shear blade and for lowering and raising the shearing apparatus.

Referring now more particularly to FIGURES 1–5 of the drawings, the exemplary force-transmitting apparatus such as shears 10 shown therein includes a casing 12 which is formed inter alia from a pair of sidewall supports 14. The supports 14 are laterally spaced, as better shown in FIGURE 2, and each is provided with longitudinally extending, aligned slots 16, and a slideway structure 18 formed along the upper and lower edges of the slot 16, as better shown in FIGURE 1 of the drawings. In this example, the stationary shear blade structure or knife block 20 is positioned between the supports 14, as better shown in FIGURE 2, adjacent the right-hand end portion of the slots 16.

A movable shear blade structure or knife block 22 likewise extends between the supports 14 and slidably engages the slideway means 18 of each support slot 16. The knife blocks 20 and 22 are each provided with shear blades 24 and 26 respectively, which are mounted thereon in the usual fashion.

In FIGURE 1 of the drawings, the movable knife block 22 is shown in its withdrawn position to define an opening between the shear blades 24, 26 through which a bloom strand 28 or the like is spacedly inserted between cutting operations.

A driver 30 likewise extends between the lateral supports 14 and is supported upon the slideway 18 of the support slots 16 for movement longitudinally of the supports 14. Means presently to be described are coupled to the driver 30 for reciprocating the driver through a relatively short path of travel. Knife block or shear spacing and withdrawal means denoted generally by the reference character 32 are likewise mounted upon the lateral supports 14, in this example, and are utilized for converting the reciprocating movement of the driver 30 to a continuous step-wise movement of the movable knife block in its cutting direction and then for quickly withdrawing the movable knife block 22 after the cutting operation is completed. The shear spacing and withdrawing means 32 likewise will be described in greater detail hereinafter.

One arrangement for reciprocating the driver 30 in accordance with the invention includes the provision of crank means such as pitman 34 positioned between the lateral supports 14 and pinned to a transverse drive shaft 35 extending through the driver 30. In this arrangement the drive shaft 35 desirably is rotatably mounted in the driver 30, for which purpose a sleeve-type bearing 37 can be provided, in order to compensate for any slight misalignment of the driver 30 relative to the pitman 34 owing to manufacturing tolerances or the like.

Figure 6:
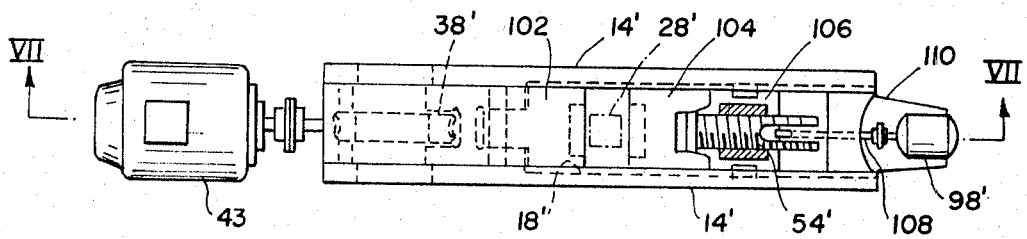
FIGURE 6 is a top plan view of another form of shear apparatus arranged in accordance with the invention and illustrating a modification of the force-multiplying means associated with the shear blade.

The pitman 34 is reciprocated, together with the driver 30 which is coupled thereto, by means of an eccentric mounted on the main or input drive shaft 36 of the apparatus. The drive shaft 36 likewise extends transversely of the lateral supports 14 on which it is mounted through suitable antifrictional means such as the roller bearings 38. The main drive shaft 36 is rotated by means of a worm gear 39 which is pinned to the drive shaft 36 for rotation therewith. As better shown in FIGURE 1 of the drawings, the worm gear 39 and drive shaft 36 are rotated by means of a worm 40 mounted on the lateral supports 14. The worm gear 40 is rotatably mounted desirably on the lower edges of the lateral supports 14, as better shown in FIGURES 3 and 4 of the drawings, upon suitable bearings 41, and is provided at one end with a stub shaft 42 to which a suitable drive (not shown) is coupled for rotating the worm 40. An example of such driving means is illustrated in FIGURES 6 and 7 of the drawings in the form of the electric motor 43 which is coupled in a conventional manner to the worm 40'.

In this arrangement of the invention, the pitman 34 is of dual construction for maximum strength and for symmetry of force transmission. The components of the pitman 34 are spaced by means of a web 44 and, in this example, straddle the worm gear 39 for rotatable mounting on the hub extensions 46 and 48 respectively of the worm gear 39. As better shown in FIGURE 2, each hub portion 46 or 48 is eccentrically disposed relative to the centerline 50 of the main drive shaft 36, with the hubs 46, 48 being unidirectional in eccentricity. The pitman components are rotatably mounted on the eccentric hub portions 46 and 48 respectively by means of suitable antifrictional means 52, which can be similar if desired to the shaft bearings 38. Accordingly, as the main drive shaft 36 is rotated a reciprocation of relatively small stroke is imparted to the pitman 34 and thence to the driver 30. In this example of the invention, the driver 30 and the pitman 34 are reciprocated within a rectilinear dimension of about ½", and accordingly, the eccentrics represented by the hub portions 46 and 48 have a throw of about ¼". It will be understood, of course, that the eccentrics can be otherwise formed on the main drive shaft 36 but are provided as shown in FIGURE 2 for maximum strength and conservation of space, which, as pointed out previously, is at a premium in this application of the invention.

It will also be readily understood that the aforementioned stroke and throw can be correspondingly varied from the dimensions given so that the driver 30 and the pitman 34 can be reciprocated within a smaller or larger distance as required by a particular application of the force-multiplying mechanism. The important feature of the invention is that each stroke of the driver 30 be a fraction of the total cutting distance through which the movable knife block 22 must be actuated to sever the bloom 28 or other workpiece inserted between the shears 20-22.

Figure 5:
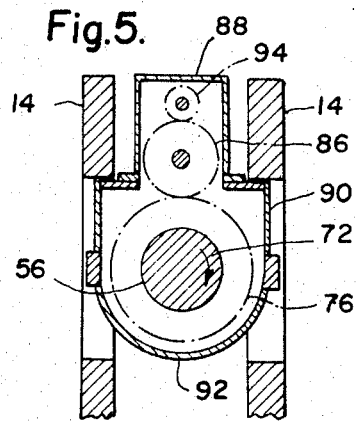
FIGURE 5 is a partial, vertically sectioned view of the apparatus of FIGURE 1 and taken generally along reference line V—V thereof.

Referring now more particularly to FIGURES 1, 2 and 5 of the drawings, one arrangement for converting the reciprocatory movement of the driver 30 into incrementally continuous or step-wise cutting movement of the movable knife block 22 will now be described. In this arrangement the driver 30 is spacedly coupled to the movable knife block 22 by means of a jack screw or other appropriately sized screw 54 or the like. The threaded portion 56 of the screw 54 is threadedly engaged with the movable knife block 22 by means of a threaded nut 58 which surrounds at least a portion of a longitudinally extending aperture 60 of the knife block 22. At its other end, the screw 54 is rotatably joined to the driver 30 by means of its headed portion 62, which is retained on the driver 30 by means of an apertured clamp plate 64 engaging the outer periphery of the headed portion 62.

With the rotative clamping securance between the screw 54 and the driver 30, it will be seen that the screw 54 likewise is reciprocated with and to the extent of that of the driver 30. It will be obvious that the connections of the screw 54 can be reversed, if desired, so that it is rotatably secured to the knife block 22 and threadedly engaged with the driver 30.

An annular bearing 66 is recessed centrally into the adjacent face of the driver 30 and in this example the headed portion 62 is provided with a centering pin 68 which is engaged in the opening of the annular bearing 66 in order to align the screw 54 with the driver 30. Desirably the bearing 66 and the adjacent surface of the headed portion 62 of the screw are provided with complementary spherical surfaces denoted generally by the reference character 70 to accommodate any slight axial misalignment of the screw 54 and the driver 30 which may occur during operation of the shear.

The threaded portion 56 of the screw 54 preferably is recessed within the movable knife block 22 to the extent at the withdrawn position of the shear that upon rotation of the screw 54 and its unthreading from the knife block 22 the latter is moved through the distance required to make the cut while still maintaining adequate threaded engagement between the screw 54 and the knife block 22.

In the operation of the shear, the screw 54 is maintained in a stationary rotative position during each forward stroke of the driver 30 to maintain the spacing between the driver and the knife block 22 so that the latter is advanced a corresponding distance toward the stationary knife block 20. However, during each return stroke of the driver 30, means forming part of the spacing and knife block withdrawing means 32, alluded to previously, are provided for rotating the screw 54, for example in the clockwise direction as denoted by arrow 72 in FIGURE 5, in order correspondingly to increase the gap between the driver 30 and the movable knife block 22. Desirably, the screw 54 is rotated at such speed that the movable knife block 22 remains motionless during each withdrawal movement of the driver 30. Thus, the blade 26 of the knife block 22 is advanced step-wise through the material of the workpiece being cut, during the forward strokes of the driver 30.

In many applications of the invention, the workpiece is completely sheared or severed when the blade 26 of the movable knife block 22 has passed between ⅔ and ¾ of the thickness of the workpiece. Accordingly, a limit switch 74 can be positioned as shown in FIGURE 1 at a location suitably spaced from the blade 24 of the fixed knife block 20, preferably on one of the lateral supports 14 so as to be out of the path of the severed workpiece section, in order to reverse the aforesaid rotating means for the screw 54. During such reverse movement of the rotating means, as described hereinafter in greater detail, the screw 54 is continuously rotated in the counterclockwise direction in this example, in order to withdraw rapidly the movable knife block 22 to its retracted position shown in FIGURES 1 and 2.

With reference now more particularly to FIGURES 1 and 5 of the drawings, an exemplary arrangement of the invention is illustrated for intermittently rotating the screw 54 for the purpose of increasingly spacing the movable knife block 22 from the driver 30 during the cutting operation and for continuously rotating the screw 54 in the opposite direction for rapid withdrawal of the movable knife block 22 following the cutting operation. Such rotational means, in this example, includes a spur gear 76 rotatably mounted on a suitable bearing arrangement 78 which is in turn supported by a pair of generally parallel transversely extending supporting plates 80. In this arrangement the plates 80 extend between and are secured to the lateral supports 14. The spur gear 76 is movably keyed to the screw 54 for rotation therewith by means of one or more keying members 82, with one such keying member being employed in this example. The keying members 82 are recessed into the surfaces of the screw 54 and are slidably engaged in respective grooves 84 extending transversely within the hub structure of the spur gear 76. With this arrangement the screw 54 can be reciprocated transversely of the spur gear 76 while still remaining keyed thereto for rotation therewith.

An idler gear 86 is mounted on a shaft supported in the extension 88 of gear housing 90, which is formed by the spur gear supports 80 and by a metal band 92 extending therearound. The idler gear 86 is in turn enmeshed with pinion 94, which in turn is secured for rotation on an output shaft 96 of drive motor 98 for the aforementioned gearing train. In this arrangement the drive motor 98 is mounted upon supporting plate 100 extending transversely between the lateral supports 14 and secured at its ends thereto.

In this arrangement of the invention, the pitch of the threaded portion 56 bears a spatial relationship to the stroke of the driver 30. For example, the pitch of the threaded portion 56 can be such that the screw 54 is rotated twice during each withdrawal movement of the driver 30 and pitman 34 as caused by rotation of the eccentrics 46–48. The motor 98, which will of course be rotated a larger number of times depending upon the specific gearing relationship between the spur and pinion gears, can if desired be operated intermittently through a suitable switching arrangement (not shown) coupled to or otherwise energized by the eccentrics 46–48. On the other hand, when the movable knife block 22 has been advanced to the reversing switch 74, after the workpiece segment has been sheared, the motor 98, through other circuitry in parallel with the aforementioned circuitry and actuated by the reversing switch 74, can if desired be energized to rotate the screw 54 continually in the opposite direction until the movable knife block 22 is completely and rapidly withdrawn. At the latter position of the movable knife block 22, a second limit switch (not shown) desirably is positioned to again reverse the rotation of the motor 98.

Preferably, however, the driving means 98 is provided in the form of a low-speed electric motor which can be intermittently stalled without damage thereto. In the latter arrangement, the motor 98 is continuously energized during forward movement of the movable knife block 22. Thus, when a cut is to be made, the motor 98 is energized and the screw 54 is rotated to rapidly advance the movable knife block 22 across the gap which normally exists between the cutter blade 26 and the workpiece 28 at the fully withdrawn position of the movable knife block 22. When the movable knife block 22 thus engages the workpiece 28, the motor 98, of course, stalls and the succeeding forward stroke of the driver 30 loads the screw 54 to prevent further rotation thereof in either direction and to maintain the spacing then existing between the movable knife block 22 and the driver 30. The driver 30 continues through the forward stroke to advance the movable knife block 22 through the first increment of its cutting movement. At the end of the forward stroke, the driver 30 reverses to unload the screw 54 whereupon the screw 54 is again rotated by the continuously energized motor 98 to take up the increased spacing between the driver 30 and the movable knife block 22 afforded by the reverse stroke of the former. The succeeding forward stroke of the driver 30 again loads the screw 54 against rotation and advances the movable knife block 22 a second increment of the cutting movement of the shear. Incremental movement of the movable knife block 22 is continued in this manner until the blade 26 thereof has been moved through between ⅔ and ¾ of the thickness of the workpiece, at which point shearing thereof is usually completed. At this point this limit switch 74 is engaged by the movable knife block 22 to rapidly retract the movable block as explained above. Increased speed of shear transit is, of course, impossible in conventional eccentric-actuated machines since the eccentric induces only a single forward stroke for each cut. Thus, the force-multiplying mechanism incorporated in the shears aids in performing the cutting operation with much less applied torque in less time.

Referring now to FIGURES 6 and 7 of the drawings, another arrangement of the force-multiplying means of the invention is illustrated therein. In the latter figures of the drawings, similar reference characters with primed accents are utilized to denote similar components of the preceding figures.

In the latter arrangement of the invention, the opposed knife blocks 102 and 104 are each mounted for reciprocal movement upon the slideways 18' formed as described above on the lateral supporting members 14'. In the latter arrangement, however, the left-hand knife block 102 (as viewed in the drawings) is coupled directly to the pitman 34', and the driver 30 of the preceding figures is omitted from the organization of FIGURES 6 and 7. The coupling between the pitman 34' and the left-hand knife block 102 can be effected, if desired, in a manner similar to that described in connection with the coupling between the pitman 34 and the driver 30 of the preceding figures. In the arrangement of FIGURES 6 and 7, then, the left-hand knife block 102 undergoes reciprocatory cutting movement, rather than a stepwise advance through the workpiece 28'. However, as explained in detail below, a desirably small portion of the total cut is made during each forward stroke of the block 102.

On the other hand, the right-hand knife block 104, which is likewise mounted for sliding, rectilinear movement relative to the lateral supports 14', is advanced intermittently to urge the workpiece 28' against the reciprocating knife block 102 during each reverse stroke of the block 102. In furtherance of this purpose, the headed end of screw 54' is rotatably secured to the right-hand knife block 104 and is threaded through a suitably aligned and tapped aperture of crossbrace 106 extending transversely between and fixedly joined at its ends to the lateral supports 14'. The screw 54' can be rotatably coupled to the knife block 104, for example in the manner in which the screw 54 of the preceding figures is coupled to the driver 30. The screw 54' is, therefore, generally similar in contour to the screw 54 with the exception that the screw 54' can be continuously threaded if desired.

It will be apparent that the connections of the screw 54' can be reversed, as noted above with reference to the screw 54 of FIGURES 1–5.

The other end of the screw 54' desirably is rigidly coupled to a stub shaft 108 which in turn is coupled in a conventional manner for rotation by a suitable gearing unit 110 actuated, for example, by motor 98'. The motor 98' can be suitably energized and controlled, for example as described above in connection with the motor 98 and limit switch 74.

Briefly, then, the right-hand knife block 104 and the workpiece 28' engaged thereby are advanced when the screw 54' is unloaded during the reverse strokes of the reciprocatory movements of the left-hand knife block 102, but remain stationary during the forward strokes of the left-hand knife block 102 so that the workpiece portion on the upper side of the cut, as viewed in FIGURE 7, is advanced toward the left-hand knife block instead of the workpiece portion beneath the cut, as viewed in FIGURE 1 of the drawings, being advanced toward the right-hand knife block 20.

Figure 3:
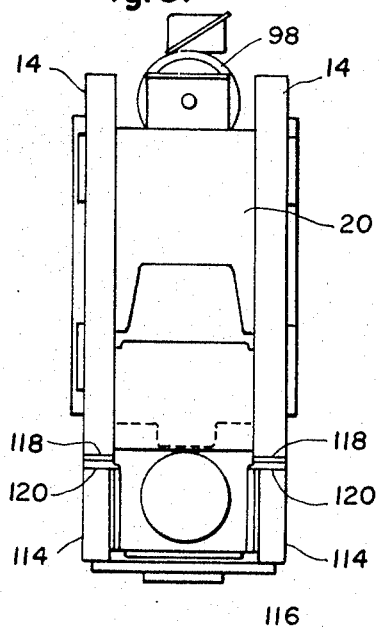
FIGURE 3 is an end elevational view of the apparatus as shown in FIGURE 1.
Figure 4:
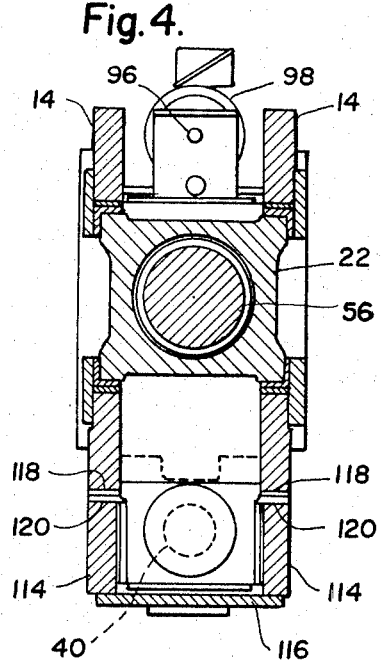
FIGURE 4 is a vertically sectioned view of the apparatus of FIGURE 1 and taken along reference line IV—IV thereof.

For use in vertical bloom apparatus, the shearing apparatus of FIGURES 6 and 7 otherwise can be arranged generally as in FIGURES 1–5 of the drawings for use with an elevating table such as that denoted generally by reference character 112 and beter shown in FIGURES 1, 3 and 4 of the drawings.

Figure 8:
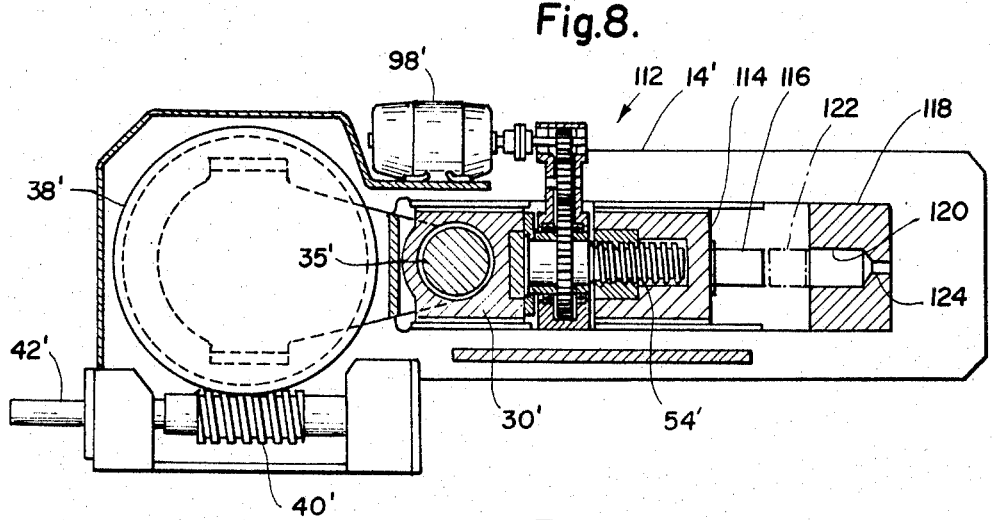
FIGURE 8 is a longitudinally sectioned view of still another application of the force-multiplying means of the invention.

Referring again to the latter figures and to FIGURE 8 of the drawings, the elevating table 112 includes a pair of uprights 114 which are generally laterally aligned with the lateral supports 14 of the shearing apparatus, and a bridging plate 116. Appropriate bearing or wear strips 118 and 120 desirably are sandwiched respectively therebetween to facilitate sliding engagement of the lower edges of the lateral supports 14 with the upper edges of the elevating table 112. The shearing apparatus thus can be moved longitudinally of the elevating table 112 by conventional positioning apparatus denoted generally by reference character 122 and including lever 124 and link 126.

In this specific application of the invention, the elevating table 112 and with it the shearing apparatus 10 desirably is raised and lowered each time a cut is made, by means of a pair of force-multiplying mechanism 128 constructed in accordance with the invention. In this arrangement, the force mechanisms 128 are arranged generally in the form of a screw jacks and are spaced so as to engage the end portions respectively of the elevating table 112. Therefore, as better shown in FIGURE 1 of the drawings, each of the lifting means 128 are provided with a worm gear 130, and the worm gears 130 are driven simultaneously in this example by a pair of worms 132 respectively, which are spacedly mounted upon drive shaft 134 for rotation therewith. The drive shaft 134 is coupled to suitable conventional driving means such as electric motor 136.

Each worm gear 130 is rotatably mounted upon suitable anti-frictional means 138 which in turn are mounted in gear casing 140 forming part of the lifting means housing 142. The worm gear 130 is provided with a central, tapped aperture or elevating screw whereby the bear threadedly engages a hollow traversing or jack screw 144, and thus roattion of the worm gear 130 raises and lowers the jack screw 144 in the conventional manner, as the latter is secured against rotation to the underside of the elevating table 112. A bellows 146, if desired, can be provided between the traversing screw and housing to protect the housing 142 and the parts therein against entry of dirt or other foreign matter. The driving means 136 can be rotated in either direction to raise and lower the elevating table 112 as desired.

However, in order to considerably reduce the load stresses which must be carried by the motor 136, the shaft 134 and the aforedescribed components of the screw jack, means are provided in accordance with the invention for continuously applying a biasing or counter-balancing force to the elevating table 112. Such counter-balancing force in effect reduces to a large extent the weight of the elevating table 112 which must be carried by the moving components of the lifting mechanism 128. Desirably, the weight of the elevating table 112 and the shearing apparatus 10 are not completely counter-balanced so that some load remains applied to the lifting mechanism to avoid backlashing gears and other tolerance deviations. However, it is contemplated that in certain applications, it will be desirable to entirely counter-balance the weight of the aforementioned table and the shears or other apparatus which may be carried by the lifting mechanisms 128. In still other applications, it may be desirable to over counter-balance the load carried by the lifting mechanism 128 rather than to under counter-balance such loads.

One form of such counter-balancing means of the invention includes the provision of a hollow or apertured supporting and stabilizing stud 148 for the jack screw 144, which stud is flanged at its lower end for securance to the housing 142 of the lifting mechanism. At the retracted position of the jack screw 144, the stud 148 desirably extends substantially along the length thereof and through its internal cavity 150.

The integrity of the sealed housing 142 is preserved by suitable sealing means such as O-ring 149 disposed at the junction of the housing 142 and the stud or stationary piston 148. More importantly, however, the stud 148 is sealed to the inner wall surfaces of the hollow traversing screw 144 by suitable means such as hydraulic packing 151 which is retained in the position shown by an annular ring 152 which is bolted or otherwise secured to the lower end of the traversing screw 144. The threaded engagement of the worm gear 130 and the traversing screw 144 is such that at the lowermost position of the traversing screw 144, as viewed in FIGURE 1 of the drawings, the upper end of the jack screw 144 does not engage the upper end of the stud 148 in order to leave a pressure distributing gap therebetween. The piston or stud 148 is of such length that interfitting engagement with the jack screw 144 is maintained.

With the arrangement just described, stud 148 serves as a plunger, which, however, is maintained at a stationary position by its securance to the housing 142, while the hollow jack screw 144 serves as a movable cylinder. Accordingly, a suitable conduit 156 is coupled to the stud 148 at its central passage 158 extending longitudinally therethrough, and when the conduit 156 is coupled to a suitable source of hydraulic fluid or the like, pressure is transmitted to the gap 154 in order to apply a continuous lifting force to the adjacent surface of the top portion of the jack screw 144. Desirably, the conduits 156 of both lifting mechanisms 128 are coupled to a suitable accumulator (not shown) of conventional construction so that the forces thus transmitted to the jack screws 144 are not diminished as the latter are extended upwardly to raise the elevating table 112. The pertinent diameters of the stud 148 and the jack screw 144 can of course be varied depending upon the amount of counter-balancing lifting force which is desired to be applied to the top portion of the jack screws 144 and hence to the elevating table 112 or other apparatus carried by the lifting mechanism 128.

In an exemplary application of this feature of the invention, a summation of the counter-balancing forces thus applied by the lifting mechanism can equal 90% of the total weight of the shearing apparatus 10 and the elevating table 112, with the result that the power of the drive motor 136, can be reduced to about 10%. Similarly, the corresponding sizes of the drive shaft and the gearing train 130–132 can be reduced. Such reductions obviously will result in substantially reduced procurement and maintenance costs of the lifting mechanisms.

Referring now to FIGURE 8 of the drawings, another exemplary application of the invention is illustrated in the form of an extrusion press denoted generally by reference character 112 and including a ram support 114, which is slidably mounted upon the lateral supports 14'. In the descriptions of this and the following FIGURES 10–14, similar reference characters with primed accents denote similar components of FIGURES 1–5. A ram 116 is mounted on the support 114 for longitudinal motion therewith relative to the supports 14', and the ram 116 is aligned with extrusion die block 118 and particularly the die cavity 120 therein. The ram support 114 is threadedly engaged with screw 54' forming part of the force-multiplying mechanism and described above in detail with reference to FIGURES 1–5 of the drawings.

In the extrusion press 112, rotation of the worm 40', together with intermittent operation of the screw 54' imparts a series of incremental forward movements to the ram 116, in the manner described in connection with the movable block 22 of FIGURES 1–5, to urge the material 122 to be processed into the cavity 120 and through the die opening 124 thereof. If desired, the extrusion press 122 can be mounted upon an elevating table to facilitate alignment thereof with associated equipment, and an example of such table is illustrated and described in connection with FIGURES 1–5 of the drawings. A number of rams similar to the ram 116 can be mounted upon the ram support 114 for parallel insertion into a like number of suitably spaced die cavities. This is made possible even with the larger sizes of rams by the tremendous forces made available by the force-multiplying mechanism of the invention.

Figure 9:
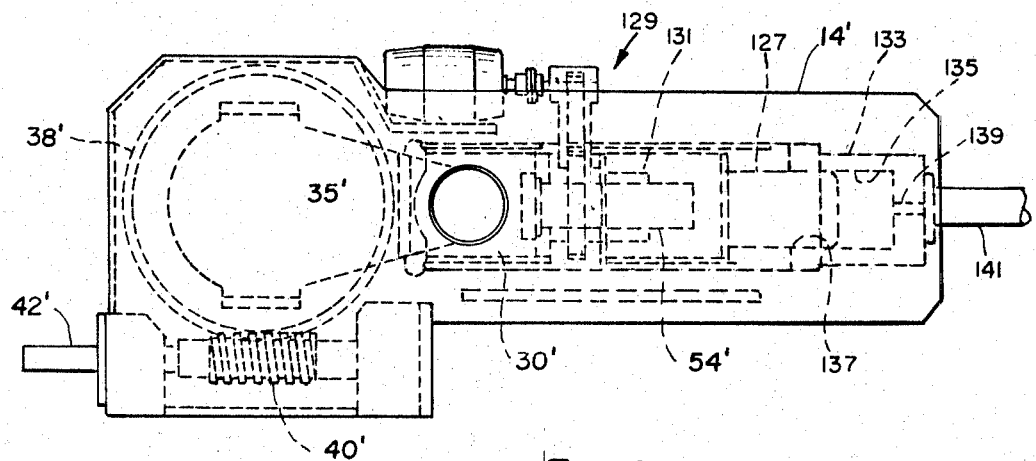
FIGURE 9 is a longitudinally sectioned view of yet another application of the force-multiplying means of the invention.

Referring now to FIGURE 9 of the drawings, the force-multiplying mechanism of the invention is utilized for driving a plunger 127 of a hydraulic intensifier mechanism or the like designated generally by reference character 129. The plunger 127 is coupled to a plunger block 131 for movement therewith longitudinally of lateral supports 14'. The plunger block 131 can be mounted on the lateral supports 14' upon slideways 18' in the manner described above. The cylinder block 133 is fixedly mounted on the lateral supports 14' and extends therebetween. A cavity or cylindrical opening 135 is provided therein in alignment with the plunger 127 which is sealed therein by means of hydraulic packing 137. The cylinder 133 is provided with an exit opening 139 whereby the cylinder can be coupled to an external high-pressure system (not shown) by means of connecting conduit, a portion of which is designated at 141.

The plunger block 131 and plunger 127 are likewise advanced intermittently by reciprocatory movements of driver 30' and intermittent rotation of spacing screw 54'. It will be understood, of course, that a number of such plungers 127 can be mounted on the plunger block 131, depending upon space limitations, for simultaneous incremental insertion into a like number of cavities 135 which can be formed in the cylinder block 133.

Figure 10:
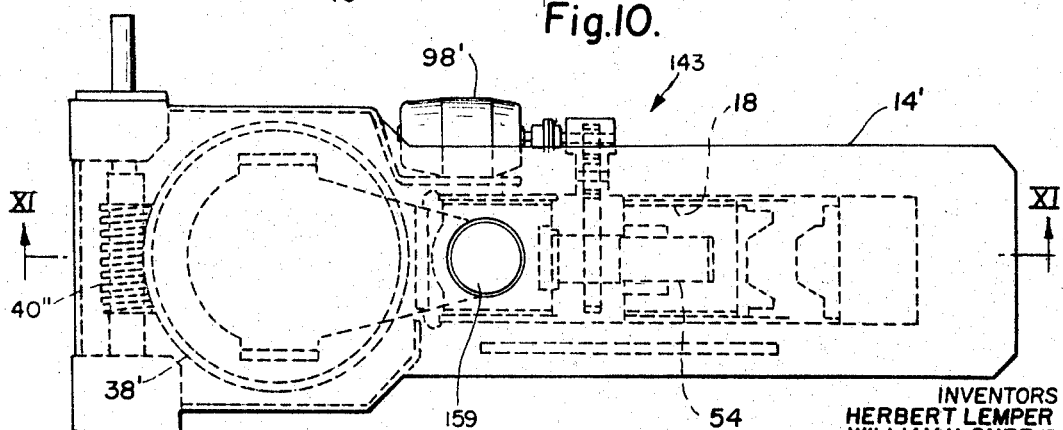
FIGURE 10 is a longitudinally sectioned view of a modified form of the force-multiplying mechanism of the invention and illustrating another application of the invention.

With reference now to FIGURES 10 and 11 of the drawings, a modification of the force-multiplying mechanism of the invention is illustrated together with another exemplary application of the invention. In the latter figures, a multiple-drive forming press denoted generally by reference character 143 is illustrated, and includes a fixed forming member or plate 145 secured at its ends to the lateral supports 14', and a movable forming member or plate 147, which is slidably engaged at its ends respectively with the slides 18' of the lateral supports 14'. In this example of the applicative concepts of the invention, the fixed and movable forming members 145, 147 are elongated in a direction transversely of the lateral supports 14', as better shown in FIGURE 12 of the drawings.

When tremendous forces are involved, a dual force-multiplying mechanism is utilized which is likewise seen more clearly in FIGURE 11. In the latter arrangement, a pair of spaced worm gears 38' are spacedly secured to the main drive shaft 36'. The worm gears 38 and the drive shaft 36, to which the gears 38 are rigidly secured for rotation therewith, are driven respectively by a pair of worms 40. Suitable driving means, similar, for example, to that illustrated in FIGURES 6 and 7 of the drawings, desirably are coupled to each of the worms 40''. An intermediate support 150a for the drive shaft 36' is supported between the lateral supports 14' by means of suitable crossbraces (not shown).

A dual pitman 153 having pairs of crank arms 155 and 157 is provided, with each pair of arms 155 or 157 straddling one of the worm gears 38' and eccentrically mounted on the hubs thereof in the manner described above with reference to FIGURES 1–5 of the drawings. The pitman 153 is pivotally coupled by means of its shaft portion 159, to a driver 160 which is slidably mounted upon the lateral supports 14' for reciprocatory movement longitudinally thereof, as described above in connection wtih the driver 30 of FIGURES 1–5.

In this arrangement of the invention, however, a driver 160 is coupled to movable forming member plate or block 147 by a pair of adjustable spacing screws 54'. Additional screws can be utilized depending upon the force distribution in the forming block 147. Means are provided for rotating each of the screws 54' during each backstroke of the driver 160 in order to separate increasingly the movable plate block 147 and the driver 160. Thus, the movable forming member 147 is advanced step-wise toward the stationary and preferably complementarily formed forming member 144. Depending upon the particular application of the invention and the loads involved, the screws 54' can be rotated by a single drive mechanism (not shown) which can be coupled to the screws 54' through suitable gearing trains or other mechanical linkages.

Referring now to FIGURES 12 and 13 of the drawings, the compactness of the force-multiplying mechanism of the invention is illustrated by its incorporation into novel open-bar shears 162 which is compact in form and hand-operated for use in the field, for example for shearing reinforcing rods used in various types of building construction. In order to provide a lateral opening 164 for the bar 166 or other workpiece to be cut, support 168 for the fixed shear blade 170 is generally of L-configuration and is secured to the outside surface of one of the lateral supports 14'. The movable shear blade 172 is mounted upon a supporting block 174 which is incrementally advanced toward the fixed shear blade 170 by the force-multiplying mechanism of the invention including adjustable spacing screw 54' and the eccentrically mounted pitman 34' and associated components. The sizes of the components of the force-multiplying mechanism together with the lateral supports 14' are of course made of a size that the shears 162 can be supported by one or both hands of an operator.

In accordance with one feature of this modification of the invention, means are provided for manually operating worm 40' and the aforementioned adjustable spacing screw 54'. In furtherance of this purpose, the worm 40' is provided with a hand crank denoted generally by reference character 176 which is secured to the stub shaft 42' of the worm gear 40'. The spacing screw 54', which in this example is threadedly engaged with the movable shear 174 and rotatably secured to the driver 30' as described above, is rotated through spur gear 76', idler gear 86' and pinion 94' from shaft 178 upon which is mounted a knurled adjustment knob 180 for rotation therewith. The adjustment shaft 178 is mounted in suitable bearings 182, which in turn are mounted upon cross-members 184 secured at their ends to the lateral supports 14' respectively.

With this arrangement the spacing screw 54' also can be rotated manually to increase the spacing between the movable shear 174 and the driver 30' during each backstroke of the driver. In a typical operation the shears 162 can be held in one hand by a workman while he manipulates the hand crank 176 with the other; at the same time, the adjustment knob can be rotated intermittently by continued pressure by the thumb of the hand holding the shears. Such operation is continued until the movable knife block 174 is advanced a sufficient distance toward the fixed knife block 168–170 to sever the bar or rod 166. It will be understood, of course, that the worm 40' and the screw 54' can be rotated as described herein by a pair of fractional horse-power motors, or by a single such motor coupled directly to the worm 40' and through a clutch to the screw 54'.

It will also be apparent that the screw 54' or 54 of any of the embodiments herein can be turned end for end and threadedly engaged with the driver 30', while its headed end is rotatably secured to the movable member, with the member and the driver 30' being suitably varied in configuration for this purpose. Obviously, too, any of the modifications of the invention, such as those typified by FIGURES 1–5 and FIGURES 8–13 can be provided with the force-multiplying means mechanism arranged as illustrated in FIGURES 6 and 7 of the drawings. As noted previously, in connection with FIGURE 8 of the drawings, it will likewise be apparent that any of the modifications of the invention having substantial weight, such as those llustrated in FIGURES 6–11 of the drawings, can be provided, if desired, with the force-multiplying lifting mechanism of the invention, as illustrated in FIGURES 1–5. In the latter connection, one or more than two such lifting mechanisms can be utilized depending upon the size and configuration of the apparatus.

From the foregoing it will be apparent that novel and efficient forms of force-multiplying mechanism have been disclosed herein. Although the mechanisms have been described in connection with certain exemplary apparatus, and formed in certain cases as parts of such apparatus, it will be understood that the mechanisms are, however, of general utility. As indicated by the several applications of the invention described herein, the force-multiplying mechanisms can be provided in a wide range of sizes and configurations within the teachings of the invention, in order to adapt the mechanism to a variety of force-transmitting apparatus and to wide ranges of sizes thereof. It is also contemplated that the force-mechanism invention can be operated to separate the force-transmitting members against suitably applied load means. Moreover, it will be understood that certain features of the invention can be utilized without a corresponding use of other features. Accordingly, while we have shown and described certain presently preferred embodiments of the invention and have illustrated presently preferred methods of practicing the same, it is to be distinctly understood that the invention is not limited thereto but may be otherwise variously embodied and practiced.

We claim:

1. In a force-multiplying mechanism for displacing at least one of a pair of force-transmitting members relative to the other, the combination comprising means for incrementally and intermittently moving one of said members against load means when disposed to be confined between said members, said moving means being intermittently operable to advance said one member against said load, and variable spacing means coupled to one of said members for moving the last-mentioned member relative to said moving means in a direction to retain said last mentioned member against said load means when so disposed so that said load means remain in engagement with both of said force-transmitting members throughout the non-operating intervals of said moving means.

2. The combination according to claim 1 wherein said moving means are coupled to said first-mentioned force-transmitting member so as to reciprocate said first-mentioned member toward and away from the other of said members, and said variable spacing means are coupled to the other of said members and are disposed to move both said other member and said load in a direction to urge said load against said first-mentioned member when said moving means would otherwise separate said one member and said load.

3. The combination according to claim 1 wherein said moving means includes a drive member mounted for movement toward and away from said first-mentioned force-transmitting member and means for reciprocating said drive member toward and away from said first-mentioned force-transmitting member, said first-mentioned member is spacedly coupled to said drive member through said variable spacing means, said spacing means being disposed to maintain the spacing between said first-mentioned force member and said drive member during a forward stroke of the drive member and to vary the spacing between said first-mentioned force member and said driving member during a reverse stroke of said driving member in a direction to move said first-mentioned drive member into incrementally forceful engagement with said load means.

4. The combination according to claim 1 wherein said variable spacing means include a screw threadedly engaged with one of said moving means and said first-mentioned force-transmitting member and rotatably secured to the other of said moving means and said first-mentioned force-transmitting member, said rotational engagement including complementary arcuate surfaces to accommodate slight misalignment between said moving means and the associated one of said means and said first-mentioned member and to prevent binding of said threaded engagement during a power stroke of said moving means, and means are provided for rotating said screw throughout a reverse stroke of said moving means.

5. The combination according to claim 1 wherein said variable spacing means include a continuously energizable motor coupled to said variable spacing means to actuate said variable spacing means during a reverse stroke of said moving means, said motor being sized so as to be overloaded and stalled during a forward stroke of said moving means.

6. The combination according to claim 3 wherein said moving means are means coupled to said first-mentioned force-transmitting member for imparting a reciprocatory motion thereto toward and away from said load means, said other member is slidably mounted for movement toward and away from said load means, said variable spacing means are coupled to said other force member and to a fixed stop mounted on said mechanism, and means are provided for actuating said spacing means to vary the spacing between said stop and said other force-transmitting member and to move said other force member in a direction to engage said load means and to urge said load means into engagement with said first-mentioned force member during a reverse stroke of said reciprocatory means.

7. The combination according to claim 6 wherein said spacing means includes a screw threadedly secured to one of said other force member and said stop and rotatably secured to the other of said other force member, and said stop, and means are provided for rotating said screw during said reverse stroke.

8. The combination according to claim 1 wherein said force-transmitting members are mounted for relative movement toward one another during their force-transmitting operation, said force transmitting members being normally spaced a predetermined distance at their inoperative positions, said moving means including a crank eccentrically mounted on a driving shaft for said mechanism, the throw of said eccentric being a minor fraction of the spacing between said force-transmitting members.

9. The combination according to claim 8 wherein said apparatus is mounted upon an elevating table, and at least one lifting mechanism is mounted in supporting relation to said elevating table, said lifting mechanism comprising means for lowering and raising said table and means for applying a continuous counter-balancing force to said table upwardly thereof.

10. The combination according to claim 9 wherein said crank is a pitman disposed in straddling relationship to a drive gear secured to said shaft for rotation therewith, said pitman providing symmetrical transmission of forces from said shaft to said one force member, said pitman being mounted upon a pair of spaced eccentrics formed on oppositely extended hub portions of said drive gear and wherein a plurality of drive gears are mounted on said drive shaft for rotation therewith, and said pitman includes a like number of pairs of crank arms mounted in straddling relationship on said drive gears respectively.

11. The combination according to claim 1 wherein said force-transmitting members are elongated in the transverse direction of said mechanism, and said variable spacing means include a plurality of screws spaced transversely of said mechanism and along the length of said force-transmitting members, each of said screws being threadedly engaged with one of said moving means and said first-mentioned force-transmitting member and rotatably secured to the other of said moving means and said first-mentioned member.

12. The combination according to claim 4 wherein said moving means are actuated by a hand crank through suitable gearing, and means are provided for rotating said screw including a thumb adjustment knob coupled to said screw through suitable gearing.

13. The combination according to claim 1 wherein said variable spacing means include a screw threadedly engaging one of said variable spacing means and said moving means and rotatably engaging the other of said variable spacing means and said moving means, said variable spacing means further including a continuously energizable motor coupled to said screw to rotate said screw during a reverse stroke of said moving means, said motor being sized so that as to be overloaded and stalled during a forward stroke of said moving means.

References Cited

UNITED STATES PATENTS

| 159,495 | 2/1875 | Brooke | 83—527 |
| 1,795,303 | 3/1931 | Gray | 83—527 |
| 2,314,886 | 3/1943 | Leslie | 83—628 X |
| 3,162,232 | 12/1964 | Munschauer et al. | 83—527 X |

ANDREW R. JUHASZ, *Primary Examiner.*

U.S. Cl. X.R.

30—92, 180; 72—447; 74—424.8; 83—320, 527, 554

UNITED STATES PATENT OFFICE
CERTIFICATE OF CORRECTION

Patent No. 3,453,914                                                July 8, 1969

Herbert Lemper et al.

It is certified that error appears in the above identified patent and that said Letters Patent are hereby corrected as shown below:

Column 3, line 2, "itmes" should read -- times --; line 31, "consrtuction" should read -- construction --. Column 8, line 27, "this", second occurrence, should read -- the --. Column 9, line 26, "beter" should read -- better --; line 60, "bear" should read -- gear --; line 62, "roattion" should read -- rotation --. Column 11, line 67, "concepts" should read -- concept --. Column 12, line 5, "40" should read -- 40″ --; line 31, "144" should read -- 145 --.

Signed and sealed this 21st day of April 1970.

(SEAL)
Attest:

Edward M. Fletcher, Jr.                          WILLIAM E. SCHUYLER, JR.
Attesting Officer                                    Commissioner of Patents